United States Patent [19]

Ramsey

[11] Patent Number: 4,985,810
[45] Date of Patent: * Jan. 15, 1991

[54] LIGHTED RUNNING BOARD ASSEMBLY

[76] Inventor: Edward Ramsey, 22615 S.R. 120, Elkhart, Ind. 46516

[*] Notice: The portion of the term of this patent subsequent to Apr. 4, 2006 has been disclaimed.

[21] Appl. No.: 328,468

[22] Filed: Mar. 24, 1989

Related U.S. Application Data

[63] Continuation of Ser. No. 864,608, May 16, 1986, Pat. No. 4,819,136.

[51] Int. Cl.$^5$ .................................................. B60Q 1/24
[52] U.S. Cl. ........................................ 362/81; 362/267; 362/375
[58] Field of Search .................. 362/267, 61, 80, 81, 362/217, 368, 374, 375, 223, 362; 280/163, 164 R

[56] References Cited

U.S. PATENT DOCUMENTS

| | | |
|---|---|---|
| 1,481,057 | 1/1924 | Gott . |
| 1,581,602 | 4/1926 | Sponder . |
| 1,681,909 | 8/1928 | Russell, Jr. . |
| 1,908,586 | 5/1933 | D'Olier, Jr. . |
| 2,426,534 | 8/1947 | Trautner . |
| 2,745,094 | 5/1956 | Harrington et al. . |
| 2,764,671 | 9/1956 | Clark . |
| 2,786,935 | 3/1957 | Geary ................................. 362/83 |
| 3,113,726 | 12/1963 | Pennow et al. . |
| 3,210,532 | 10/1965 | Woofter et al. . |
| 3,235,720 | 2/1966 | Bridge ................................ 362/267 |
| 3,242,329 | 3/1966 | Abrams . |
| 3,275,816 | 9/1966 | Brunger . |
| 3,400,262 | 9/1968 | Newman et al. . |
| 3,445,645 | 5/1969 | Newman . |
| 3,558,870 | 12/1968 | Morrison . |
| 3,678,635 | 7/1972 | Vagi et al. ......................... 362/80 |
| 3,740,544 | 6/1973 | Newman . |
| 3,780,282 | 12/1973 | Riley et al. ........................ 362/267 |
| 3,905,017 | 9/1975 | Samra . |
| 4,154,504 | 5/1979 | Mohs .................................. 350/97 |
| 4,206,499 | 6/1980 | Urbanek et al. .................. 362/267 |
| 4,259,710 | 3/1981 | Schlack ............................. 362/267 |
| 4,267,657 | 5/1981 | Kloke . |
| 4,277,818 | 7/1981 | Urbanek et al. .................. 362/267 |
| 4,281,367 | 7/1981 | Moore et al. ................. 362/267 X |
| 4,282,564 | 8/1981 | McJankin et al. ................ 362/225 |
| 4,373,284 | 2/1983 | Crane . |
| 4,380,793 | 4/1983 | Potts .................................. 362/267 |
| 4,423,474 | 12/1983 | Hamacher ......................... 362/225 |
| 4,463,962 | 8/1984 | Snyder . |
| 4,482,944 | 11/1984 | Roossine et al. ................. 362/220 |
| 4,544,991 | 10/1985 | Gorsuch ............................. 362/81 |
| 4,617,617 | 10/1986 | Cunningham et al. ........... 362/267 |
| 4,620,268 | 10/1986 | Ferenc .......................... 362/375 X |
| 4,819,136 | 4/1989 | Ramsey ............................. 362/267 |
| 4,839,629 | 6/1989 | Brown ................................ 362/61 |
| 4,851,810 | 7/1989 | Vitale et al. ....................... 362/61 |
| 4,860,174 | 8/1989 | Kato et al. ......................... 362/61 |

FOREIGN PATENT DOCUMENTS

1531250 5/1968 France ................................ 362/362

Primary Examiner—Stephen F. Husar
Assistant Examiner—D. M. Cox
Attorney, Agent, or Firm—Price, Heneveld, Cooper, DeWitt & Litton

[57] ABSTRACT

A running board light assembly which is attached to the underside of a specially designed automotive running board. For the purpose of providing both functional and decorative lighting. The running board light assembly incorporates features which serve to render the assembly impervious to the several weather - related conditions to which it may be subjected.

11 Claims, 2 Drawing Sheets

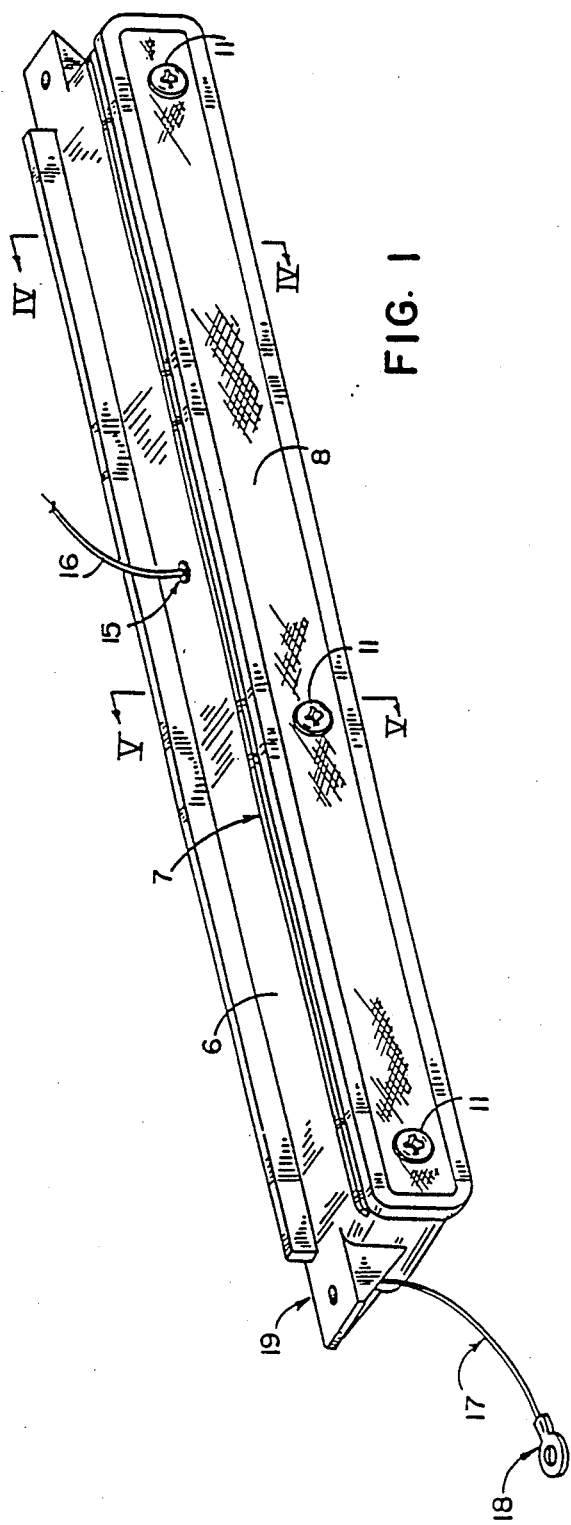

LIGHTED RUNNING BOARD ASSEMBLY

This is a continuation of application Ser. No. 864,608, filed on May 16, 1986, now U.S. Pat. No. 4,819,136.

This invention relates to improvements in running board lights adapted, though not exclusively, for use on automotive (i.e. Cargo Van Conversion) vehicles.

Vehicle running boards customarily provide a convenient assist to the entry and exit of the vehicle. These running boards typically extend from the rear of the front wheel well to the front of the rear wheel well.

Because of the extent of this expanse, running board manufacturers have made various attempts to enhance the appearance of these boards. A typical approach to this problem is to provide several openings midway along the length, and through the lower-most vertical profile of the running board. Directly behind these openings (and directly beneath the actual stepping surface of the running board) is attached any of several lighting products. When activated by a switch, these lights provide a definite asthetic enhancement to the running board as well as an added safety feature in the form of a side marker light.

The primary problem with this add-on light approach is that no suitable lighting product exists which provides adequate protection from adverse weather effects (i.e. water infiltration) yet still allows a means of lamp replacement when required.

With the foregoing in mind, a new and different running board light is contemplated which incorporates a uniquely designed snap on lens that locks to the body of the assembly. This lens is further secured to the body by (3) screws which pass thru the lens and self-thread into posts which are an integral part of the body.

Also contemplated is a gasket system which, being placed between the snap on lens and the assembly body, prevents infiltration of moisture past the several mating surfaces of the lens and body.

Further contemplated is the use of water-tight grommets located at two (2) places on the body of the assembly which permit the passage of lead wires out of the assembly while preventing moisture infiltration through these passages.

Another object is the provision of a flange, integral to the body, located on the top surface of the body directly to the rear of the lens/body juncture which serves to channel accumulated water away from this juncture.

A further object is the use of (3) specially designed snap in lamp sockets which, having the lamp installed, forms a water tight seal around the lamp, providing redundant protection from moisture infiltration which, at this spot in the assembly, could cause a short-circuiting of the socket if not so protected.

The foregoing and other objects and advantages of this invention will become apparent from the following description and from the accompanying drawings in which:

FIG. 1 Is a perspective view of a running board light assembly depicting the location and orientation of the several external components of the assembly;

FIG. 2 Is an end view of the FIG. 1 assembly showing locations and orientation of additional components;

FIG. 7 is a partially sectioned side elevation showing a running board light assembly mounted to a running board.

Figure 3:
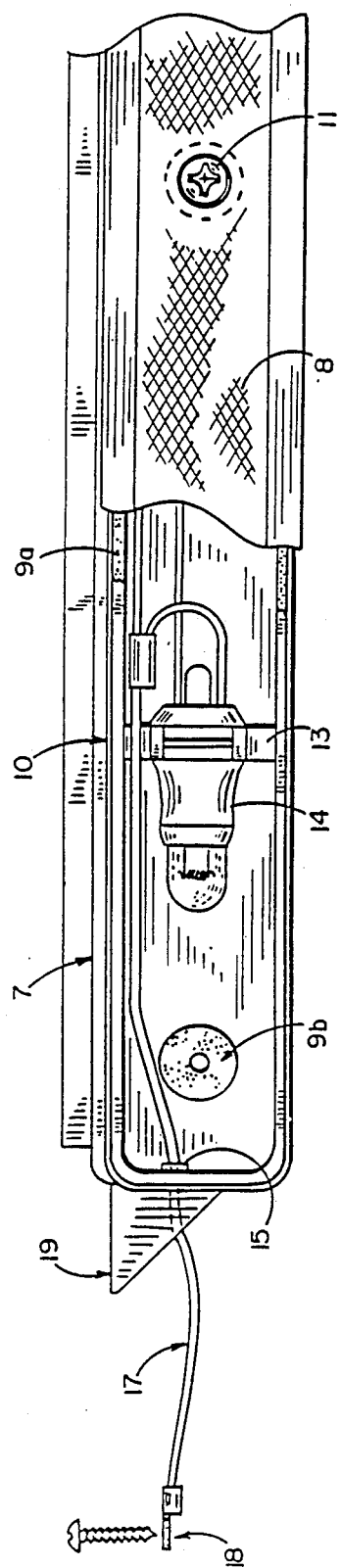
FIG. 3 Is a close-up cutaway view of the FIG. 1 running board light assembly depicting the location of the several internal components of the assembly.

Refering, first to FIGS. 1, 2 and 7, the running board light assembly incorporating the principals of the invention is generally denoted by the numeral 1 and is shown in FIGS. 1 and 7, oriented as it would be when installed in the proper location on the underside of the running board 22 behind opening 24 in vertical profile 26 of the running board. The running board light assembly 1 includes a main body 6 which is formed of any one of several Polyethylene compounds. The body 6 incorporates an integral drip rail 7 which serves to channel away any water which will accumulate along the top surface of the body 6. The running board light assembly 1 further incorporates A lens 8 which is formed of Polycarbonate material that may be tinted any number of colors, and which possesses a translucent quality sufficient to allow the passage of light. The interior surface of lens 8 is formed into a diamond shaped pattern which diffuses the light emanating from lamp/socket 14 as it passes through lens 8. This lens 8 is partially secured to the body 6 by means of self threading plated screws 11.

An additional feature is presence of two (2) holes through the body 6 which permits the passage of hookup wires 16 and 17. These holes are then protected from moisture infiltration by snap in rubber grommets 15 whose inside diameter is sufficintly undersized as to form a watertight seal around wires 16 and 17.

Refering next to FIG. 3, the cutaway portion reveals an anchoring ridge 10 over which lens 8 snaps, by capturing the ridge within an internal anchoring channel 10a of the lens, further securing lens 8 to body 6. FIG. 3 also exposes gasket system 9A and 9B. Gasket 9A functions as a water-tight seal between body 6 and lens 8, while gasket 9B serves a similar function at the openings in lens 8 where screws 11 pass through. Another feature visible in FIG. 3 is the interior portion of grommet 15 showing the passage of wire 17 through the body 6. The grommet 15 shown in FIG. 1 and in conjunction with wire 16, functions in a like manner. FIG. 3 also shows the location of one of several water tight lamp/socket assemblies 14.

This socket 14 mounts to the interior of body 6 by means of a snap fit into mounting bracket 13 which is an integral part of body 6. Also shown is ring terminal 18 attached to wire 17 through which passes the running board light assembly mounting screw 28. This screw is then passed through mounting flange 19 and screwed into the underside of the running board effectively producing an electrical ground.

Figure 5:
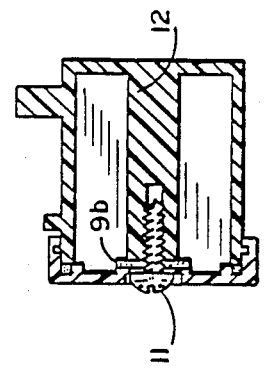
FIG. 5 Is a sectional view of the running board light assembly taken along line 5—5 in FIG. 1.
Figure 4:
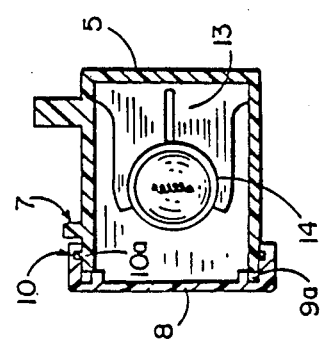
FIG. 4 Is a sectional view of the running board light assembly taken along line 4—4 in FIG. 1.

FIG. 4 and FIG. 5 are sectional views of the running board light assembly 1 which further clarify the foregoing descriptions. FIG. 5 details the screw boss 12 into which screw 11 anchors after passing through lens 8 and gasket 9B respectively.

Figure 6:
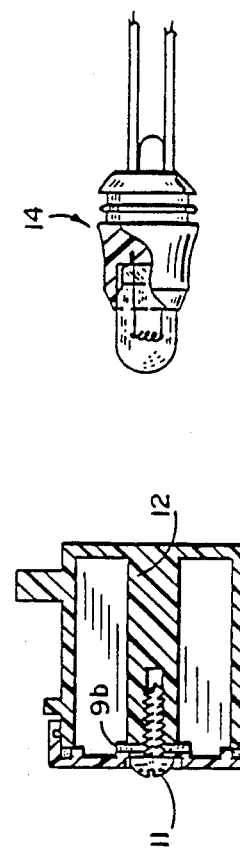
FIG. 6 Is a seperate view of the water tight rubberized lamp socket as seen in FIG. 3, having the numerical designation of numeral 14.

FIG. 6 Is a side view of lamp/socket 14 and is presented to enhance the understanding of how lamp/socket 14 functions, both in sealing the lamp from moisture infiltration and in how it fits into mounting bracket 13.

From the foregoing it will be appreciated that because of the construction of the running board light assembly the running board manufacturer can be assured of a functional light assembly which will be free of the effects of adverse weather conditions and their inherent warranty problems while still providing the end user with a simple means of lamp replacement when it becomes necessary to do so. By simply removing the screws and lens, the wedge based lamp can be removed from the socket and a new lamp reinstalled into the socket.

What is claimed is:

1. A lighted running board assembly for a vehicle, comprising, in combination:
   an elongated running board having means defining stepped surfaces, at least one of said stepped surfaces having means defining an opening;
   surface means defining an elongated water-tight tubular-shaped enclosure including a body having means defining a longitudinally extending cavity and an opening to said cavity, said enclosure further including a removable cover means for covering said opening;
   a portion of said surface means being translucent in order to provide a light-passing lens;
   mounting flange means integral with said body for mounting said body on said running board with said lens behind said opening in said one of said stepped surfaces;
   each of said cover and body means having integral anchor means which mate with each other for positioning said cover over means said longitudinal extending opening to enclose said enclosure;
   at least one lamp socket positioned within said cavity when said cover means is attached to said body;
   a removable lamp mounted in each said lamp socket;
   a plurality of anchor posts positioned within said cavity, said anchor posts being longitudinally distributed within said cavity; and
   fastener means passing through said cover means for cooperative engagement with said anchor posts, said fastener means having means for engaging with said anchor posts to provide bearing pressure between said body and cover means along said anchor means whereby said fastener means, anchor posts and anchor means cooperate to provide a water-tight seal of the assembly during use and allows removal of said cover means for facile replacement of said lamp.

2. The running board assembly of claim 1 wherein each said anchor means extends continuously around the perimeter of said opening in said body.

3. The running board assembly of claim 2 in which said anchor means includes means defining a channel in said cover means and means defining a ridge in said peripheral wall.

4. The running board assembly of claim 1 wherein said lamp socket means includes a socket body molded of flexible compound, said socket body defining a lamp-receiving cavity and a collar portion surrounding said cavity and extending into engagement with the lamp globe.

5. The running board assembly in claim 1 further including hookup wires connected with said lamp socket and extending through said surface means for providing electrical interconnections to said lamp.

6. A lighted running board assembly for a vehicle, comprising, in combination:
   an elongated running board having means defining a stepped surface including a vertical surface portion and edge means defining an opening in said vertical surface portion;
   an elongated tubular-shaped body having a peripheral wall defining top and bottom elongated surfaces and vertical side surface interconnecting opposite ends of said elongated surfaces, said body further including means defining a first vertical elongated surface joined with said peripheral wall to form a cavity including means defining a longitudinal extending opening to said cavity;
   a second vertical elongated surface defining a removable cover positioned over said longitudinal extending opening for enclosing said body, one of said elongated surfaces being translucent in order to provide a light passing lens;
   indexing means integral with said body for mounting said body on said running board with said lens behind said opening in said vertical surface portion;
   at least one lamp socket positioned within said cavity when said cover is attached to said body;
   a removable lamp mounted in each lamp said socket;
   a plurality of anchor posts positioned within said cavity, said anchor posts being longitudinally distributed within said cavity;
   sealing means for sealing said cover over said longitudinal extending opening; and
   fastener means passing through said cover for cooperative engagement with said anchor posts, said fastener means having means for engaging with said anchor posts to provide bearing pressure between said body and cover along said sealing means whereby said fastener means, anchor posts and sealing means cooperate to provide a water-tight seal of the assembly during use and allows removal of said cover for facile replacement of said lamp.

7. The running board assembly of claim 6 in which said sealing means includes means defining a rearwardly facing channel in said cover entirely surrounding said longitudinal extending opening.

8. The running board assembly of claim 6 further including means extending along the entire said top elongated surface adjacent said longitudinal extending opening for channeling away accumulated moisture from said longitudinal extending opening.

9. The running board assembly of claim 6 further including hookup wires connected with said lamp socket and extending through one of said longitudonal surfaces for providing electrical interconnections to said lamp.

10. The running board assembly of claim 6 wherein said lamp socket includes a socket body molded of flexible compound, said socket body defining a lamp-receiving cavity and a collar portion surrounding said cavity and extending into engagement with the lamp globe.

11. A lighted running board assembly for a vehicle, comprising, in combination:
    an elongated running board having means defining a stepped surface including a vertical surface portion and edge means defining an opening in said vertical surface portion;
    an elongated tubular-shaped body having a peripheral wall defining top and bottom elongated surfaces and vertical side surface interconnecting opposite ends of said elongated surfaces, said body further including means defining a first vertical elongated surface joined with said peripheral wall to form a cavity including means defining a longitudonal extending opening to said cavity;

a second vertical elongated surface defining a removable cover positioned over said longitudinal extending opening for enclosing said body, one of said elongated surfaces being translucent in order to provide a light passing lens;

mounting flange means integral with said body for mounting said body on said running board with said lens behind said opening in said vertical surface portion;

at least one lamp socket positioned within said cavity when said cover is attached to said body;

a removable lamp mounted in each said lamp socket;

at least one anchor post positioned within said cavity;

sealing means for sealing said cover over said longitudonal extending opening;

fastener means passing through said cover for cooperative engagement with said anchor post, said fastener means having means for engaging with said anchor post to provide bearing pressure between said body and cover along said sealing means whereby said fastener means, anchor post and sealing means cooperate to provide a watertight seal of the assembly during use and allows removal of said cover for facile replacement of said lamp; and a drip rail extending upwardly from said top elongated surface for channeling away accumulated moisture from an interface defined between said cover and said opening, said drip rail being separate from said interface and extending substantially the entire said top elongated surface.

* * * * *

UNITED STATES PATENT AND TRADEMARK OFFICE
CERTIFICATE OF CORRECTION

PATENT NO. : 4,985,810
DATED : January 15, 1991
INVENTOR(S) : Edward Ramsey

It is certified that error appears in the above-identified patent and that said Letters Patent is hereby corrected as shown below:

Column 4, Claim 9, Line 49:
   "longitudonal" should be --longitudinal--;
Column 5, Claim 11, Lines 16-17:
   "longitudonal" should be --longitudinal--.

Signed and Sealed this

Tenth Day of October, 1995

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 4,985,810
DATED : January 15, 1991
INVENTOR(S) : Edward Ramsey

It is certified that error appears in the above-indentified patent and that said Letters Patent is hereby corrected as shown below:

Column 2, Line 3
  "seperate" should be separate—;

Column 2, Line 21
  "A" should be —a—;

Column 2, Line 33
  "sufficintly" should be —sufficiently—;

Column 2, Line 9
  "refering" should be —referring—; and

Column 2, Line 35
  "refering" should be —referring—;

Column 4, Claim 6, Line 16
  "indexing" should be —mounting flange—;

Signed and Sealed this

Fifth Day of December, 1995

Attest:

BRUCE LEHMAN

*Attesting Officer*    Commissioner of Patents and Trademarks